J. F. O'CONNOR.
FRICTION SHOCK ABSORBING MECHANISM.
APPLICATION FILED SEPT. 23, 1918.
1,307,312.
Patented June 17, 1919.
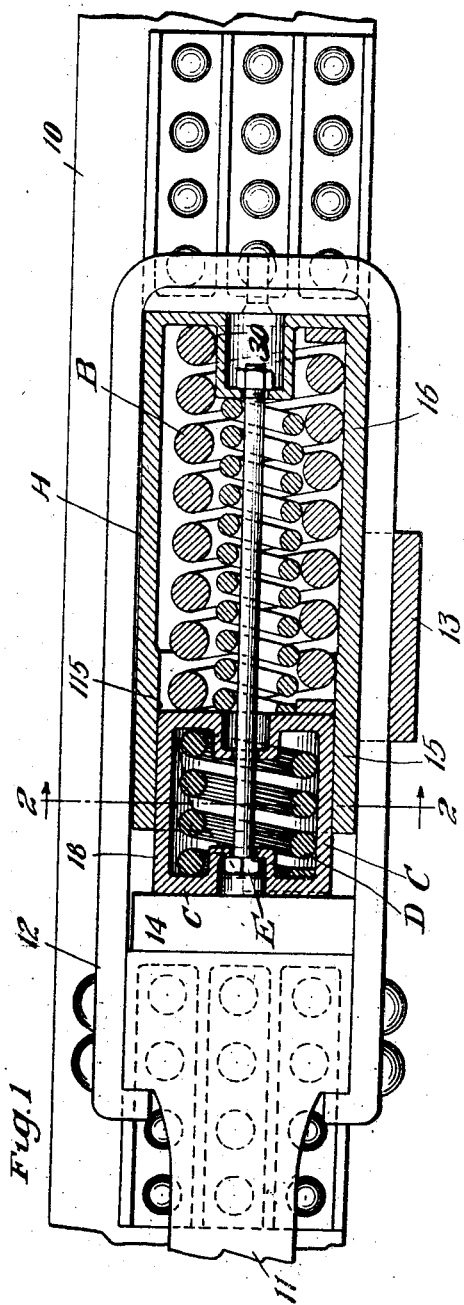
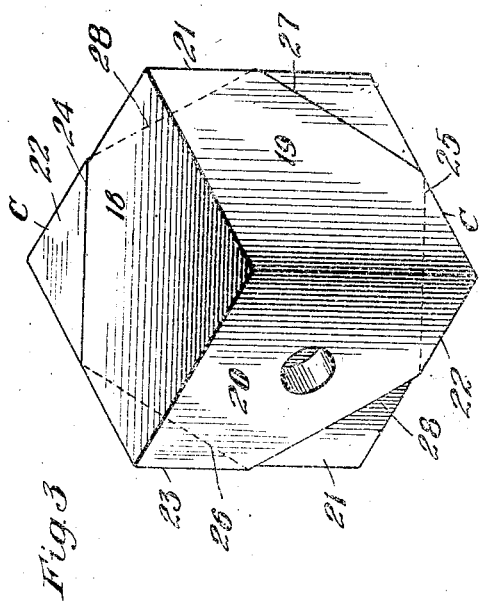
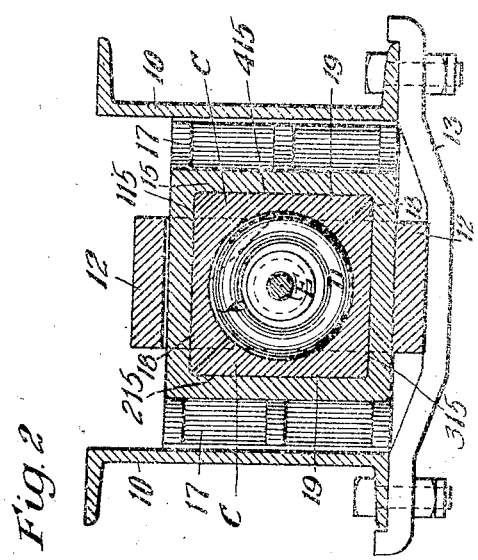
Inventor
John F. O'Connor
By George I. Haight
Atty.

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

1,307,312.   Specification of Letters Patent.   Patented June 17, 1919.

Application filed September 23, 1918. Serial No. 255,241.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanism, of which the following is a full, clear, concise, and exact description, reference being had to the accompanying drawings, forming a part of this specification.

This invention relates to improvements in friction shock absorbing mechanism.

One object of the invention is to provide a friction shock absorbing mechanism of simple and economical construction and more particularly adapted for use in railway draft riggings.

Another and more specific object of the invention is to provide a friction shock absorbing mechanism employing a set of novel combined wedge and friction elements having self-contained releasing means.

In the drawing forming a part of this specification, Figure 1 is a part vertical, longitudinal section, part elevational view of a portion of a railway draft rigging showing my improvements in connection therewith. Fig. 2 is a vertical, transverse, sectional view, taken on the line 2—2 of Fig. 1. And Fig. 3 is a detail, perspective view of the set of combined friction wedge elements.

In said drawing, 10—10 denote channel draft sills of a railway car to the inner faces of which are secured the usual front and rear sets of stop lugs. The draw bar 11 is operatively connected with the shock absorbing mechanism by the usual form of yoke 12 and the parts are supported by a detachable saddle plate 13. A front follower 14 is also shown interposed between the draw bar and the front end of the shock absorbing mechanism proper.

The shock absorbing mechanism, as shown, includes a casting A, main spring B, friction elements C—C, release spring D and retaining bolt E.

The casting A is formed at its front end with a rectangular friction shell 15 and rearwardly thereof with a spring casing 16. At its rear end, the casting A may be widened, as indicated at 17—17 in Fig. 2, in order to adapt the casting to better act as the rear follower of the draft rigging. The main spring B preferably consists of two coils, an outer heavy coil and an inner lighter coil bearing against the rear portion of the casting A. As will be understood, the friction shell 15 provides four flat interior friction faces 115, 215, 315 and 415, with which coöperate the friction elements, as hereinafter described.

In the construction shown, there are two friction elements C—C of identical form. Each of said elements C is provided with a pair of longitudinally extending friction faces 18 and 19 in planes at right angles to each other so as to coöperate with two adjacent flat friction faces of the shell 15. In addition, each element C has one large end face 20 and a smaller end face 21 at the opposite end of the element. Each element C has also two triangular shaped faces 22 and 23 as shown in Fig. 3. The various faces 18, 19 and 20 are in the form of squares with triangular sections cut off from one corner thereof, thus providing coöperating sets of wedge faces, as indicated at 24, 25, 26, 27, 28 and 29, all of said wedge faces being in a single plane. The elements C are made hollow, as clearly illustrated in the drawing, and when assembled, form a substantially hollow cube and within the cube unit thus formed is disposed the release spring D.

The bolt E extends through suitable perforations in the end walls of the members C and the boss 30 formed on the rear of the casting A. The head of the bolt is seated in a suitable socket formed in the outer member C and the nut of the bolt is seated within the boss 30 and in actual practice, the bolt will be sufficiently tightened so as to place both the spring B and spring D under an initial compression.

In actual construction, the two members C will be so made that, in normal position of the parts, they will not form an exact cube or prism but on the contrary, will form a unit which conforms in cross section to the cross section of the shell 15 when the end wall 20 of one element C is extended outwardly slightly beyond the adjacent triangular wall 21 of the other element C at the outer end of the mechanism. With this construction, upon inward movement of the draw bar, pressure will be transmitted to the outer face 20 of one member C and force the latter rearwardly with a wedging action against the other element C, with a tendency to expand the cross section of the frictional unit, thus forcing the two friction faces of each element C into frictional engagement with the adjacent corresponding friction faces of the shell 15. The entire frictional unit will be resisted by the main spring B and as the two frictional elements slide relatively with respect to each other, the preliminary spring D will be compressed within the friction unit. Consequently, upon release of the pressure from the draw bar, the spring D will expand sufficiently to shift the friction elements C relatively to each other and thereby permit the return of the parts to normal position under the influence of the main spring B.

Although I have herein shown and described what I now consider the preferred manner of carrying out the invention, the same is merely illustrative and I contemplate all changes and modifications that come within the scope of the claims appended hereto.

I claim:

1. In a friction shock absorbing mechanism, the combination with a friction shell of polygonal cross section, of a main spring resistance, and a friction unit of prismatic form coöperable with said shell, said prismatic unit including two elements relatively movable and having coacting wedge faces, all of said faces being located in a common plane intersecting every face of the prismatic unit.

2. In a friction shock absorbing mechanism, the combination with a friction shell of polygonal cross section and having a plurality of interior flat friction faces, of a main spring resistance, and a hollow friction unit within said shell, said unit being of polygonal cross section corresponding to the cross section of the shell and having a plurality of exterior flat friction faces coöperable with those of the shell, said unit having a release spring therewithin, the unit comprising a plurality of elements relatively slidable and provided each with wedge faces, all of said wedge faces being in a common plane.

3. In a friction shock absorbing mechanism, the combination with a casting having a friction shell at one end thereof, the shell being of substantially rectangular cross section and providing four interior flat friction faces, of a main spring resistance disposed within said casting, and a hollow friction unit coöperable with said shell, said hollow unit comprising two friction elements, each element having a pair of friction faces and a plurality of wedge faces, the friction faces coöperating with those of the shell and the wedge faces coöperating with each other, and a release spring within said elements.

In witness that I claim the foregoing I have hereunto subscribed my name this 9th day of Sept., 1918.

JOHN F. O'CONNOR.